United States Patent
Lienard et al.

(10) Patent No.: US 8,121,192 B2
(45) Date of Patent: Feb. 21, 2012

(54) METHOD AND SYSTEM FOR TREATING NOISE IN A GENERATED IMAGE

(75) Inventors: Jean Lienard, Igny (FR); Vincent Auvray, Paris (FR); Régis Vaillant, Villebon sur Yvette (FR)

(73) Assignee: General Electric Company, Schenectady, NY (US)

( * ) Notice: Subject to any disclaimer, the term of this patent is extended or adjusted under 35 U.S.C. 154(b) by 1273 days.

(21) Appl. No.: 11/401,043

(22) Filed: Apr. 10, 2006

(65) Prior Publication Data

US 2007/0058880 A1    Mar. 15, 2007

(30) Foreign Application Priority Data

Apr. 11, 2005 (FR) .................................. 05 03549

(51) Int. Cl.
*H04N 7/12* (2006.01)

(52) U.S. Cl. ......... 375/240.12; 375/240.11; 375/240.13; 375/240.14; 375/240.15

(58) Field of Classification Search . 375/240.11–240.15
See application file for complete search history.

(56) References Cited

U.S. PATENT DOCUMENTS 7,106,894 B1   9/2006 Boutenko et al.

FOREIGN PATENT DOCUMENTS

| EP | 1 030 268 A | 8/2000 |
|---|---|---|
| FR | 2 790 123 A1 | 8/2000 |
| JP | 2000244817 A | 9/2000 |

OTHER PUBLICATIONS

Aach et al., "Bayesian motion estimation for temporally recursive noise reduction in x-ray fluoroscopy", Philips J. of Research, vol. 51, No. 2, 1998, pp. 231-251.

Stuke et al., Estimation of multiple motions using block matching and Markov random fields:, Proc. SPIE, vol. 5308, No. 1, 2004, pp. 486-496.

(Continued)

*Primary Examiner* — Jayanti K Patel
*Assistant Examiner* — Geepy Pe
(74) *Attorney, Agent, or Firm* — Cantor Colburn LLP

(57) ABSTRACT

A process and system for improving a digital image of an object defined by pixels, acquired at the instant t and generated from an X-ray detector receiving X-rays emitted by a source. The process includes: determining a predicted image of the object at the instant t as a function of the images of the object acquired at the instants t–i, i being a positive whole number greater than or equal to 1, and moving of each of the layers constituting the image acquired at the instant t, the number of layers being previously fixed and the moving of each of the layers being previously determined; and generating a visualized image corresponding to a weighted sum of the predicted image and the image of the object acquired at the instant t, so as to attenuate the noise of the image of the object acquired at the instant t.

21 Claims, 2 Drawing Sheets

OTHER PUBLICATIONS

Close et al., "Layer decomposition of coronary angiograms", vol. 3979, 2000, pp. 1230-1234.

Auvray et al., "Multiresolution parametric estimation of transparent motions and denoising of fluoroscopic images", Int. Conf. on Medical Image Computing and Computer Assisted Intervention, Oct. 2005.

Proceedings of the 2005 International Conference on Image Processing (ICIP 2005); Genoa, Italy; Sep. 11-14, 2005; IEEE; vol. 1; pp. 1-3; http://www.informatik.uni-trier.de/~ley/db/conf/icip/icip2005-1.html.

Japanese Office Action for Japanese Application No. 2006-108845; Publication Date: Apr. 20, 2006; Mailing Date: Aug. 9, 2011; 3 pgs.

METHOD AND SYSTEM FOR TREATING NOISE IN A GENERATED IMAGE

CROSS-REFERENCE TO RELATED APPLICATIONS

This application claims the benefit of a priority under 35 USC 119(a)-(d) to French Patent Application No. 05 03549 filed Apr. 11, 2005, the entire contents of which are hereby incorporated by reference.

BACKGROUND OF THE INVENTION

The present invention relates to the field of radiological imaging with X-rays, which allows for example the organs of a patient to be viewed. The invention more particularly relates to the processing of fluoroscopic images for attenuating the noise of the fluoroscopic images to make them clearer; nevertheless, the invention could also be applied, in general, to the processing of any image, and in particular, a radiographic image.

In the field of medical imaging, it is well known to utilize fluoroscopic images to guide surgical instruments during a surgical procedure. These fluoroscopic images are acquired by an imaging apparatus comprising of means for providing a radiation source, such as X-rays, positioned opposite means for receiving an image and/or detecting the radiation, the means for providing a radiation source and the image receiver and/or detector being capable of driven in rotation about at least one axis, usually three axes, means for control, means for acquisition, means for image visualisation and means for command. The patient is positioned on a table to be moved in the three possible translations associated with a given space, that is, longitudinally, laterally and vertically, such that the part of the body of the patient to be examined and/or treated extends between the radiation source and the image receiver. This mobility of the table and of the radiation source and of the image receiver allows a practitioner to acquire the images for any part of the body of a patient lying on the table. Therefore, it is usual to utilize fluoroscopic images in two dimensions obtained by irradiation of the patient using low doses of radiation, a contrast agent preferably being injected previously, during intervention to guide the instrument in the organ of the patient to be treated. The information associated with these fluoroscopic images can be, introduced to images reconstructed in three dimensions for improving the guidance of surgical instruments. Alternatively, images acquired in three dimensions can be projected onto the fluoroscopic images acquired in two dimensions during the intervention.

Contrary to radiographic images acquired by the imaging apparatus emitting radiation in strong doses providing images of good quality with a low noise level, that is, presenting a high signal to noise ratio, the fluoroscopic images obtained with lower doses of radiation comprise a higher noise level, that is, presenting a low signal to noise ratio, and are thus of inferior quality, which is likely to disturb the course of surgical intervention. In effect, the noise registered by the radiation detector and appearing on the images is of quantum origin and depends on the square root of the number of photons detected per pixel. When the dose of radiation is reduced, the noise decreases less rapidly than the dose, such that the noise to signal ratio grows. In addition to the quantum noise the basic movement associated especially with the respiration of the patient is added to the displacement of the surgical instruments and to the movements of the table on which the patient is placed.

In order to eliminate the noise from the images acquired, a time filter could be applied in the hypothesis of immobile images; nevertheless, since the images acquired are mobile in fluoroscopy, application of a simple time filter is translated by a blurred movement and/or loss of contrast of the mobile objects, apart from a noise spike.

A process for treating images in fluoroscopy comprises applying a compensated movement filter. The majority of filters of the prior art utilize a distinction criterion between a variation due to noise and a variation due to movement; nevertheless, stopping filtering causes the reappearance of the noise, which is translated on the images by streaks of noise behind the mobile objects.

In order to rectify these disadvantages, processes for treating a sequence fluoroscopic of images improving the quality of the visualized images have already been conceived. This is the case, for example, in FR 2 790 123, which describes a process in which, for each acquired current image, the moving of the current image is determined relative to the preceding image acquired in the acquisition plane of the images, a preceding offset filtered image is shaped by spatially moving the preceding filtered image, and the current filtered image is shaped by the weighted average between the current acquired image and the preceding offset filtered image. This type of process has the drawback of not yielding satisfying results. In fact, the fluoroscopic images appear as superposition of layers of transparent images such that it is impossible to clearly identify the pixels and the physical objects. Thus, even if the global movement of the image sequence can be determined, the different layers of the objects cannot be separated for filtering them time-wise independently of one another, resulting in loss of contrast of the image and a streak of noise behind the mobile objects.

BRIEF DESCRIPTION OF THE INVENTION

An embodiment of the invention is to rectify these disadvantages by a process for improving an image, such as a digital image of an object generated from a radiation detector receiving radiation emitted by a source by efficaciously attenuating the noise of the image to render a clearer image.

An embodiment of the present invention is a process for improving a digital image of an object defined by pixels, acquired at the instant t and generated from a radiation detector receiving radiation emitted by a source comprising at least of determining a predicted image of the object at the instant t as a function of the images of the object acquired at the instants t−i, i being a whole positive number greater than or equal to 1, and moving each of the layers constituting the image acquired at the instant t, the number of layers being previously fixed and the moving each of the layers being determined in advance, and generating a visualized image corresponding to a function of the image predicted and of the image of the object acquired at the instant t, where the function may be linear, e.g., a weighted sum.

An embodiment of the invention concerns a system for improving an image, such as a digital image, of an object defined by pixels, acquired at the instant t and generated by a radiation detector receiving radiation emitted by a source comprising means for determination of a predicted image of the object at the instant t as a function of the images of the object acquired at the instants t−i, i being a positive whole number greater than or equal to 1, and moving each of the layers, the number of layers from which the image acquired at the instant t being previously fixed is constituted and the moving of each of the layers being determined previously, and means for generating the visualized image corresponding to the sum of the predicted image and of the image of the object acquired at the instant t.

BRIEF DESCRIPTION OF THE DRAWING

Other advantages and characteristics will be understood more clearly from the following description, of several variant embodiments, given by way of non-limiting examples, on the basis of the appended drawings, in which.

DETAILED DESCRIPTION OF THE INVENTION

Figure 1:
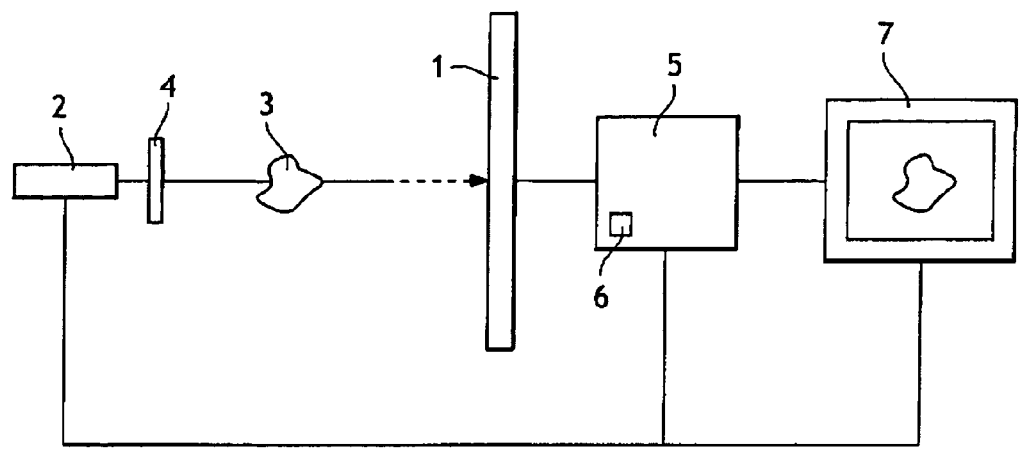
FIG. 1 is a schematic illustration of an embodiment of a system for implementing a process according to an embodiment of the present invention.

According to a general feature of an embodiment of the invention, for each image acquired at the instant t, the number N of layers from which the image acquired at the instant t is constituted is fixed, then the moving $v_n$ of each of N layers are determined from the images acquired at the instants t−i, then N primary images corresponding to the images acquired at the instants t−i are generated, from which the pixels of the sum of the moving $v_n$ of each of N layers are moved respectively, for the image acquired at the instant t−N, of the sum of N−1 moving $v_1$ of each of N layers, for the image acquired at the instant t−1−N, of the sum of N−2 moving $v_n$ of each of N layers, for the image acquired at the instant t−2−N and so on as far as each moving $v_n$, for the image acquired at the instant t−1, then a predicted image of the object is generated at the instant t corresponding to the sum in alternate symbols of N primary images, then the visualized image corresponding to the weighted sum of the predicted image is generated and of the image of the object acquired at the instant t.

The number N of layers can be fixed, from which the image acquired at the instant t is constituted, at N=2, the improvement process then comprises determining the moving $v_1$ and $v_2$ of each of the two layers from the images acquired at the instants t−1 and t−2, of generating two primary images, a first primary image corresponding to the image acquired at the instant t−1 from which the pixels of the moving $v_1$ are moved and a second primary image corresponding to the image acquired at the instant t−1 from which the pixels of the moving $v_2$ are moved, of generating an intermediate image corresponding to the sum of the two primary images, of generating a third primary image corresponding to the image acquired at the instant t−2 from which the pixels are moved according to the sum of the moving $v_1$ and $v_2$ of each of the layers, of generating an image known as predicted of the object at the instant t corresponding to the intermediate image from which is subtracted the third secondary image, and generating the visualized image corresponding to the weighted sum of the image predicted and of the image of the object acquired at the instant t.

Irrespective of the number of layers, the process according to an embodiment of the present invention comprises applying a time filter on the one hand to the image predicted and on the other hand to the image of the object acquired at the instant t prior to generation of the visualized image. The generation of the visualized image is can be obtained by the addition of the third of intensity of each pixel of the predicted image with the two thirds of intensity of each pixel of the image of the object acquired at the instant t.

To further improve the clarity of the visualized image, each image acquired at the instant t is divided into at least two frames and the steps for determining the number N of layers, of determining the moving $v_1$ of each of N layers, of generating N primary images, of generating the predicted image and generating the visualized image are applied independently for each frame. Obviously, the visualized image is obtained by assembling each of the frames after processing.

In an embodiment of the invention, the means for determining the predicted image comprises means for determining moving $v_n$ of each of N layers from images acquired at the instants t−i, means for generating N primary images corresponding to the images acquired at the instants t−i, from which the pixels of the sum of N moving $v_1$ of each of N layers are respectively moved, for the image acquired at the instant t−N, of the sum of N−1 moving $v_n$ of each of N layers, for the image acquired at the instant t−1−N, of the sum of N−2 moving $v_n$ of each of N layers, for the image acquired at the instant t−2−N and so on as far as each moving $v_n$, for the image acquired at the instant t−1, and means for generating the predicted image of the object at the instant t.

In reference to FIG. 1, the imaging system for the acquisition of images, such a fluoroscopic image, comprises means for receiving an image, such as a numerical image receiver 1, means providing a radiation source, such as an X-ray source 2 emitting radiation to the image receiver 1, the image receiver and the radiation source 2 being respectively positioned at the ends of an arm in the form of a C or a U (not shown in the figure) which pivots about three axes. Further, the object 3 to be radiated, usually a patient, is placed between the radiation source 2 and the image receiver 1. Furthermore, the imaging system comprises an adjustable collimator 4 positioned at the outlet of the radiation source 2. The imaging system comprises, in addition, means 5 for processing the image acquired by the image receiver 1, the means for processing 5 comprising at least one processor 6, and means for visualization 7 connected to the means for processing 5 for visualizing the image acquired after processing of the image to attenuate noise from the image.

Figure 2:
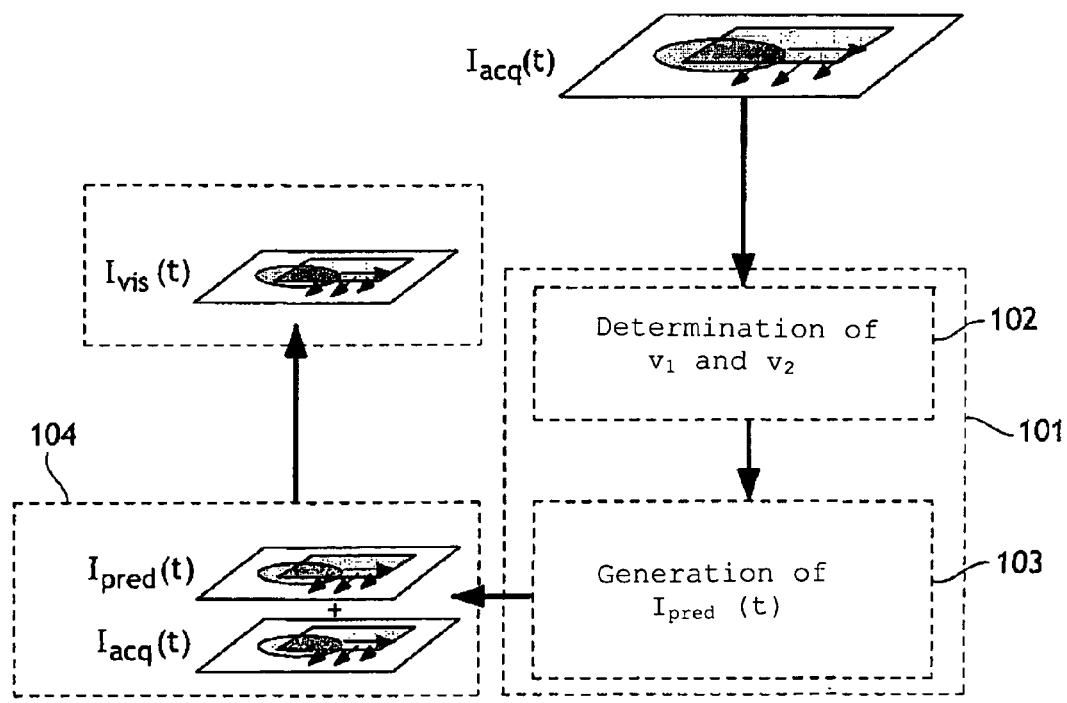
FIG. 2 is schematic illustration of the decomposition in two layers of a fluoroscopic image acquired at the instant t and the processing of the image according to an embodiment of the process.

The system for improving the image acquired at the instant t, the image in the form of a digital image, that is, defined by pixels, and transmitted to the means for processing 5, comprises a memory in which are registered the fluoroscopic images and processing algorithms of these images introduced to the processor 6 to permit their filtration. In reference to FIG. 2, the system for improving the image acquired at the instant t comprises means 101 for processing the image acquired at the instant t known as $I_{acq}(t)$ constituted by means 102 for determining movings $v_1$ and $v_2$ of each of the two layers which make up the image and means 103 for determining a predicted image $I_{pred}$ of the object at the instant t as a function of the images of the object acquired at the instants t−1 and t−2, and movings $v_1$ and $v_2$ of each of the layers. The system also comprises means 104 for generating the visualized image corresponding to the weighted sum of the predicted image $I_{pred}(t)$ and of the image of the object acquired at the instant t $I_{acq}(t)$.

The means 103 for determining a predicted image $I_{pred}$ of the object at the instant t as a function of the images of the object acquired at the instants t−1 and t−2 and the means 102 for determining movings $v_1$ and $v_2$ of the layers do not need to generate images of each of the layers. If an image I is constituted by two layers $I_1$ and $I_2$ moving respectively according to moving $v_1$ and $v_2$ the difference D can be written in the following form:

$$D=I(p,t)-I(p+v_1,t-1)-I(p+v_2,t-1)+I(p+v_1+v_2,t-2)$$

in which p corresponds to the position of the pixel and t corresponds to the present time.

By decomposing the image I into two layers $I_1$ and $I_2$, then we obtain the following relation:

$$D=I_1(p,t)-I_1(p+v_1,t-1)-I_1(p+v_2,t-1)+I_1(p+v_1+v_2,t-2)+I_2(p,t)-I_2(p+v_1,t-1)-I_2(p+v_2,t-1)+I_2(p+v_1+v_2,t-2)$$

or $$D=(I_1(p,t)-I_1(p+v_1,t-1))-(I_1((p+v_2),t-1)-I_1((p+v_2)+v_1,t-2))+(I_2(p,t)-I_2(p+v_2,t-1))-(I_2(p+v_1,t-1)-I_2((p+v_1)+v_2,t-2))$$

The layers $I_1$ and $I_2$ moving respectively according to moving $v_1$ and $v_2$, each of the four terms in parentheses in the preceding equation is zero and the difference D is zero.

As a consequence, according to the first equation, we have:

$$I(p,t)=I(p+v_1,t-1)+I(p+v_2,t-1)-I(p+v_1+v_2,t-2).$$

It thus appears that $I_{pred}(t)$ can be determined as a function of the images acquired at the instants t−1 and t−2 and moving $v_1$ and $v_2$ of the two layers without needing to generate images of the layers.

The means 102 for determining the movings $v_1$ and $v_2$ of the layers comprises an algorithm such as described in Stuke et al., "Estimation of multiple motions using block-matching and Markov random fields", Proceedings of the SPIE, vol. 5308, no. 1, 2004, pages 486-496, in Visual Communications and Image Processing 2004, S. Panchanathan and B. Vasudev, eds. IS&T/SPIE 16th Annual Symposium Electronic Imaging, San Jose, Calif., USA, Jan. 18-22, 2004. In this algorithm, the moving $v_1$ and $v_2$ of the layers are considered as constant in time, which does not correspond to the anatomical movements of the heart, the diaphragm, etc.

According to a variant embodiment of the system for processing an image, the means for determining moving comprises an algorithm determining the moving of the layers according to an affine function with 6 parameters per layer, that is, two translations, two rotations and two homotheties. Accordingly, the moving vector at each point (x,y) for the layer i can be written in the following form:

$$v_{ix}(x,y)=c_{i,1}+a_{i,1}.x+a_{i,2}.y \text{ et } v_{iy}(x,y)=c_{i,2}+a_{i,3}.x+a_{i,4}.y$$

Consequently, for the totality of the image, we should minimize the following function to 12 parameters:

$$J(\vartheta_1, \vartheta_2) = \sum_{(x,y)\in\mathcal{F}} r(x, y, v_1(x, y), v_2(x, y))^2$$

in which $\mathcal{F}$ indicates the frame of the image and $r(x,y,v_1(x,y),v_2(x,y))$ is given by:

$$r(x,y,v_1,v_2)=I(x+v_{1x}+v_{2x},y+v_{1y}+v_{2y},t-1)+I(x,y,t+1)-I(x+v_{1x},y+v_{1y},t)-I(x+v_{2x},y+v_{2y},t)=0$$

The minimization of the function with 12 parameters is obtained by application of the method of conjugated gradients on the linearized function applied to three successive images decomposed into a Gaussian pyramid. The linear increments of the parameters are then determined by the Gauss-Newton method in each level of resolution of the pyramid, by commencing with the level of lowest resolution and by propagating the parameters obtained towards the level of higher resolution.

Figure 3:
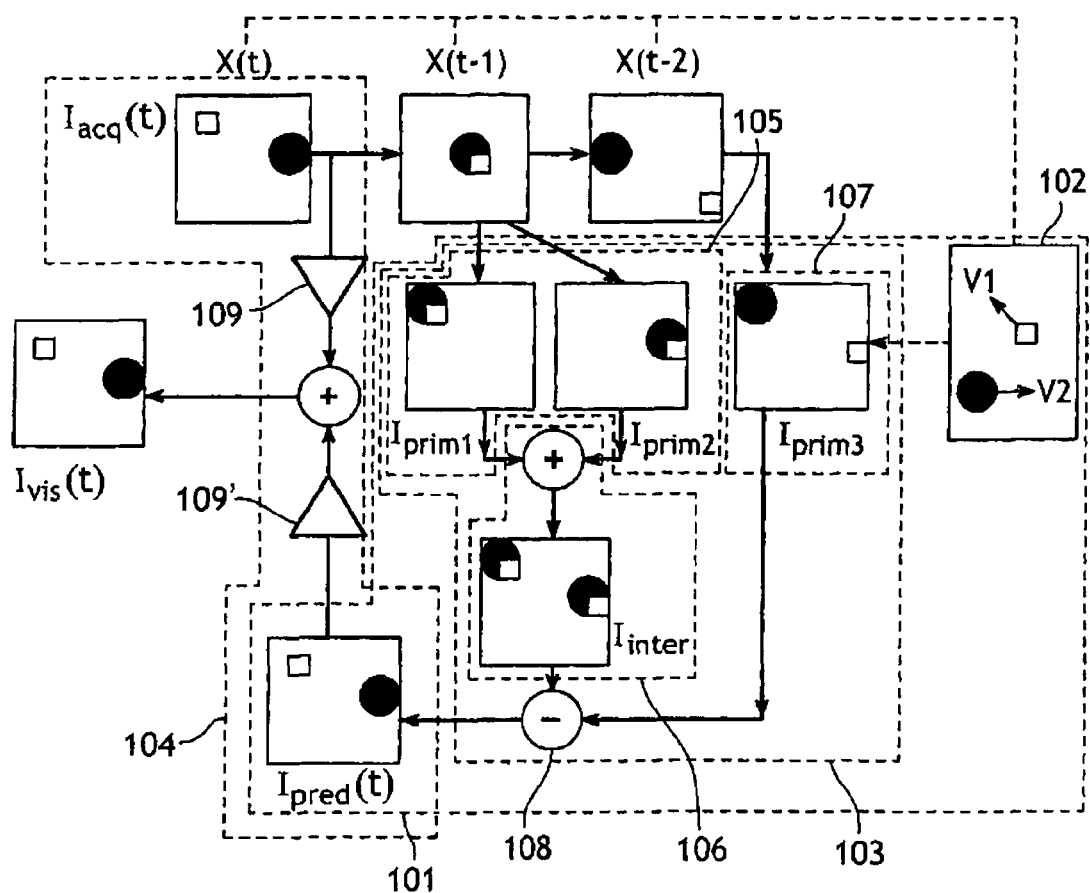
FIG. 3 is a schematic diagram of an embodiment of the process for the treatment of an image decomposed in two layers.

In addition, the means 103 for determining a predicted image $I_{pred}$ of the object at the instant t as a function of the images of the object acquired at the instants t−1 and t−2 comprise, in reference to FIG. 3, means 105 for generating two primary images $I_{prim1}$ and $I_{prim2}$ corresponding to the image acquired at the instant t−1 from which the pixels are respectively moved of the moving $v_1$ and of the moving $v_2$ of each of the layers and means 106 for generating an intermediate image $I_{inter}$, corresponding to the sum of the two primary images $I_{prim1}$ and $I_{prim2}$. The means 101 for determining a predicted image $I_{pred}$ of the object at the instant t as a function of the images of the object acquired at the instants t−1 and t−2 comprise, in addition, means 107 for generating a third primary image $I_{prim3}$ corresponding to the image acquired at the instant t−2 from which the pixels are moved according to the sum $v_1+v_2$ of the movings $v_1$ and $v_2$ of each of the layers and means 108 for generating the predicted image $I_{pred}(t)$ of the object at the instant t corresponding to the intermediate image $I_{inter}$ from which is subtracted the third primary image $I_{prim3}$.

The means 104 for generating the visualized image $I_{vis}$ comprises two multipliers 109 and 109', a first multiplier 109 for weighting by a factor, preferably ⅓, the image acquired at the instant t $I_{acq}(t)$ and a second multiplier 109' for multiplying by the complement at a previous factor, that is, ⅔, the predicted image $I_{pred}$, for adding the thus weighted intensity of each pixel of the predicted image $I_{pred}$ with the weighted intensity of each pixel of the image of the object acquired at the instant t $I_{acq}$. The visualized image $I_{vis}$ thus presents an attenuated noise improving the quality of the image.

In a variant embodiment of the system, the system comprises means for dividing each image acquired into at least two distinct frames, the images of each frame being processed independently of one another in the same manner as earlier.

To obtain greater attenuation of the noise, the frames are preferably small regular frames that are assembled on completion of the processing of each frame to reconstitute the visualized image $I_{vis}$.

It is understood that the decomposition of the image acquired at the instant t can be effected according to more than two layers. In fact, according to the teaching of Stuke et al., supra, the equation $$I(p,t)=I(p+v_1,t-1)+I(p+v_2,t-1)-I(p+v_1+v_2,t-2)$$

can be generalized for N layers in the following form:

$$I(p, t) = (-1)^N I(p, v_1 + \ldots + v_N, t - N) + $$
$$(-1)^{N-1} \sum \{picking N - 1 different velocities among the v_i\}$$
$$I(v_{i1} + \ldots + v_{iN-1}, t - 1 - N) + \ldots +$$
$$(-1)^{N-k} \sum \{picking N - k different velocities among the v_i\}$$
$$I(v_{i1} + \ldots + v_{iN-k}, t - k) + \ldots + \sum \{Every v_i\} I(v_i, t - 1)$$

The embodiment of the system can thus be generalized for the decomposition of the image acquired at the instant t $I_{acq}(t)$ in N layers. The system comprises means of determination of a predicted image of the object at the instant t as a function of the images of the object acquired at the instants t−i, i being positive whole number greater than or equal to N, and moving each of the layers, and means for generating the visualized image corresponding to the weighted sum of the predicted image and of the image of the object acquired at the instant t. The means for determining the predicted image comprises means for determining moving $v_n$ of each of N layers from images acquired at the instants t−i, means for generating N primary images corresponding to the images acquired at the instants t−i, from which the pixels are moved from different combinations of the moving $v_n$ of each of N layers, and means for generating a predicted image corresponding to the sum in alternating symbols of N primary images.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

What is claimed is:

1. A process for treating an image of an object defined by pixels, the image being acquired at an instant t comprising: receiving a first image of the object at an instant t−2; receiving a second image of the object at an instant t−1; generating first and second primary images based on the second image, and first and second moving vectors, respectively; determining a predicted image of the object at the instant t as a function of the first and second primary images and the first image; and generating a visualized image corresponding to a function of both the predicted image and the image of the object acquired at the instant t, so as to attenuate a noise of the image of the object acquired at the instant t.

2. The process according to claim 1 further comprising: fixing a number N of layers from which the image acquired at the instant t is constituted; determining moving vector $v_n$ of each of N layers from images acquired at the instants t−i, i being a whole number greater than or equal to 1; generating of N primary images corresponding to the images acquired at the instants t−i, from which the pixels are moved respectively of a sum of N moving vector $v_n$ of each of N layers, for the image acquired at an instant t−N, of a sum of N−1 moving vector $v_1$ of each of N layers, for the image acquired at an instant t−1−N, of a sum of N−2 moving vector $v_n$ of each of N layers, for the image acquired at an instant t−2−N and so on including each moving vector $v_n$, for the image acquired at the instant t−1; and generating the predicted image of the object at the instant t corresponding to a sum in alternate symbols of N primary images.

3. The process according to claim 1 further comprising: fixing a number N of layers, from which the image acquired at the instant t is constituted, at N=2; determining the first and second moving vectors $v_1$ and $v_2$ of each of the two layers from the images acquired at the instants t−1 and t−2; generating the first and second primary images, the first primary image corresponding to the image acquired at the instant t−1 from which the pixels are moved utilizing the first moving vector $v_1$ and the second primary image corresponding to the image acquired at the instant t−1 from which the pixels are moved utilizing the second moving vector $v_2$; generating an intermediate image corresponding to a sum of the first and second primary images; generating a third primary image corresponding to the image acquired at the instant t−2 from which the pixels are moved according to a sum of the first and second moving vectors $v_1$ and $v_2$ of each of the layers; and generating the predicted image of the object at the instant t corresponding to the intermediate image from which is subtracted the third secondary image.

4. The process according to claim 2 further comprising: fixing a number N of layers, from which the image acquired at the instant t is constituted, at N=2; determining the first and second moving vectors $v_1$ and $v_2$ of each of the two layers from the images acquired at the instants t−1 and t−2; generating the first and second primary images, the first primary image corresponding to the image acquired at the instant t−1 from which the pixels are moved utilizing the first moving vector $v_1$ and the second primary image corresponding to the image acquired at the instant t−1 from which the pixels are moved utilizing the second moving vector $v_2$; generating an intermediate image corresponding to a sum of the first and second primary images; generating a third primary image corresponding to the image acquired at the instant t−2 from which the pixels are moved according to a sum of the first and second moving vectors $v_1$ and $v_2$ of each of the layers; and generating the predicted image of the object at the instant t corresponding to the intermediate image from which is subtracted the third secondary image.

5. The process according to claim 1 further comprising applying a time filter to the visualized image resulting from the function of the predicted image and of the image of the object acquired at the instant t.

6. The process according to claim 2 further comprising applying a time filter to the visualized image resulting from the function of the predicted image and of the image of the object acquired at the instant t.

7. The process according to claim 3 comprising applying a time filter to the visualized image resulting from the function of the predicted image and of the image of the object acquired at the instant t.

8. The process according to claim 5 wherein the visualized image is generated by addition of the third of intensity of each pixel of the predicted image to two thirds of intensity of each pixel of the image of the object acquired at the instant t.

9. The process according to claim 1 wherein each image acquired is divided into at least two frames, and the generating the predicted image and the generating the visualized image, are applied independently for each frame.

10. The process according to claim 2 wherein each image acquired is divided into at least two frames, and the generating the predicted image and the generating the visualized image are applied independently for each frame.

11. The process according to claim 3 wherein each image acquired is divided into at least two frames, and the generating the predicted image and the generating the visualized image are applied independently for each frame.

12. The process according to claim 5 wherein each image acquired is divided into at least two frames, and the generating the predicted image and the generating the visualized image are applied independently for each frame.

13. The process according to claim 8 wherein each image acquired is divided into at least two frames, and the generating the predicted image and the generating the visualized image are applied independently for each frame.

14. The process of claim 1 wherein the visualized image is a fluoroscopic image.

15. A system for treating an image of an object defined by pixels, the image being acquired at an instant t comprising: means for providing a radiation source; means for receiving a first image of the object at an instant t−2, a second image of the object at an instant t−1, and the image of the object at the instant t; means for generating first and second primary images based on the second image, and first and second moving vectors, respectively; means for determining a predicted image of the object at the instant t as a function of first and second primary images and the first image; means for generating a visualized image corresponding to a function of both the predicted image and of the image of the object acquired at the instant t.

16. The system according to claim 15 wherein: the means for determining the predicted image comprises means for generating N primary images corresponding to the images acquired at instants t−i, i being a whole number greater than or equal to 1, from which the pixels are moved respectively of a sum of N moving vector $v_n$ of each of N layers, for the image acquired at an instant t−N, of a sum of N−1 moving vector $v_n$ of each of N layers, for the image acquired at an instant t−1−N, of a sum of N−2 moving vector v, of each of N layers, for the image acquired at an instant t−2−N and so on including each moving vector $v_n$, for the image acquired at the instant t−1; and means for generating the predicted image of the object at the instant t.

17. The system according to claim 15 comprising a time filter applied to the visualized image resulting from the function of the predicted image and of the image of the object acquired at the instant t.

18. The system according to claim 16 comprising a time filter applied to the visualized image resulting from the function of the predicted image and of the image of the object acquired at the instant t.

19. A computer program product comprising a non-transitory computer readable medium having computer readable program code that implements the method according to claim 1.

20. An article of manufacture for use with a computer system, the article of manufacture comprising a non-transitory computer readable medium having computer readable program that implements the method according to claim 1.

21. A non-transitory computer readable medium that is readable by a machine and embodies a program of instructions executable by the machine to perform the method according to claim 1.

* * * * *